United States Patent
Inagaki

(10) Patent No.: US 9,058,113 B2
(45) Date of Patent: Jun. 16, 2015

(54) STORAGE REGION PROVIDING DEVICE, STORAGE REGION PROVIDING METHOD, AND RECORDING MEDIUM

(75) Inventor: Tomokazu Inagaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 483 days.

(21) Appl. No.: 13/240,611

(22) Filed: Sep. 22, 2011

(65) Prior Publication Data
US 2012/0082017 A1 Apr. 5, 2012

(30) Foreign Application Priority Data
Oct. 1, 2010 (JP) ................................. 2010-223339

(51) Int. Cl.
G11B 21/08 (2006.01)
G06F 12/02 (2006.01)
G06F 3/06 (2006.01)
G11B 20/18 (2006.01)

(52) U.S. Cl.
CPC ...... *G06F 3/0613* (2013.01); *G11B 2020/1893* (2013.01); *G11B 20/1883* (2013.01); *G06F 3/0631* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 8,145,841 B2* | 3/2012 | Galloway et al. | ............. | 711/114 |
| 2007/0192538 A1* | 8/2007 | Dawkins | ........................ | 711/114 |
| 2010/0097903 A1* | 4/2010 | Kimura et al. | ............. | 369/47.14 |
| 2010/0106909 A1* | 4/2010 | Kottomtharayil et al. | .... | 711/115 |
| 2010/0131724 A1* | 5/2010 | Miura et al. | ................... | 711/154 |
| 2012/0011340 A1* | 1/2012 | Flynn et al. | .................... | 711/171 |
| 2013/0073821 A1* | 3/2013 | Flynn et al. | .................... | 711/162 |

FOREIGN PATENT DOCUMENTS

| | | |
|---|---|---|
| JP | 11-85411 A | 3/1999 |
| JP | 2006-59374 A | 3/2006 |
| JP | 2009-93571 A | 4/2009 |
| JP | 2010086420 A | 4/2010 |

OTHER PUBLICATIONS

Japanese Office Action for JP Application No. 2010-223339 mailed on Feb. 25, 2014 with English Translation.

* cited by examiner

*Primary Examiner* — Wayne Young
*Assistant Examiner* — Dionne Pendleton
(74) *Attorney, Agent, or Firm* — Sughrue Mion, PLLC

(57) ABSTRACT

A storage region providing device provides a physical storage region (a physical region) as a virtual storage region (a logical region). The device accepts a writing request including data and information for specifying a partial logical region that is part of the logical region. In a case that part of the physical region is not allocated yet to a partial logical region specified by a writing request, the device allocates at least part of an initial allocation region of the physical allocation region to the partial logical region. The device moves data stored in the partial physical region included in the initial allocation region, to a movement destination region that is at least part of a reallocation region other than the initial allocation region of the physical region, and reallocates the movement destination region to the partial logical region.

10 Claims, 7 Drawing Sheets

Fig.3

| LOGICAL ALLOCATION UNIT IDENTIFICATION INFORMATION | START ADDRESS INFORMATION | END ADDRESS INFORMATION | INITIAL ALLOCATION INFORMATION |
|---|---|---|---|
| LAU1 | LAS1 | LAE1 | IA1 |
| ... | ... | ... | ... |

Fig.4

| PHYSICAL ALLOCATION UNIT IDENTIFICATION INFORMATION | START ADDRESS INFORMATION | END ADDRESS INFORMATION | REGION IDENTIFICATION INFORMATION |
|---|---|---|---|
| PAU1 | PAS1 | PAE1 | PR1 |
| ... | ... | ... | ... |

Fig.5

| PHYSICAL ALLOCATION UNIT IDENTIFICATION INFORMATION | INITIAL ALLOCATION REGION INFORMATION | PHYSICAL ALLOCATION UNIT SIZE |
|---|---|---|
| PAU1 | IAF1 | SPU1 |
| ... | ... | ... |

Fig.6

| LOGICAL ALLOCATION UNIT IDENTIFICATION INFORMATION | PHYSICAL ALLOCATION UNIT IDENTIFICATION INFORMATION |
|---|---|
| LAU1 | PAS1 |
| ... | ... |

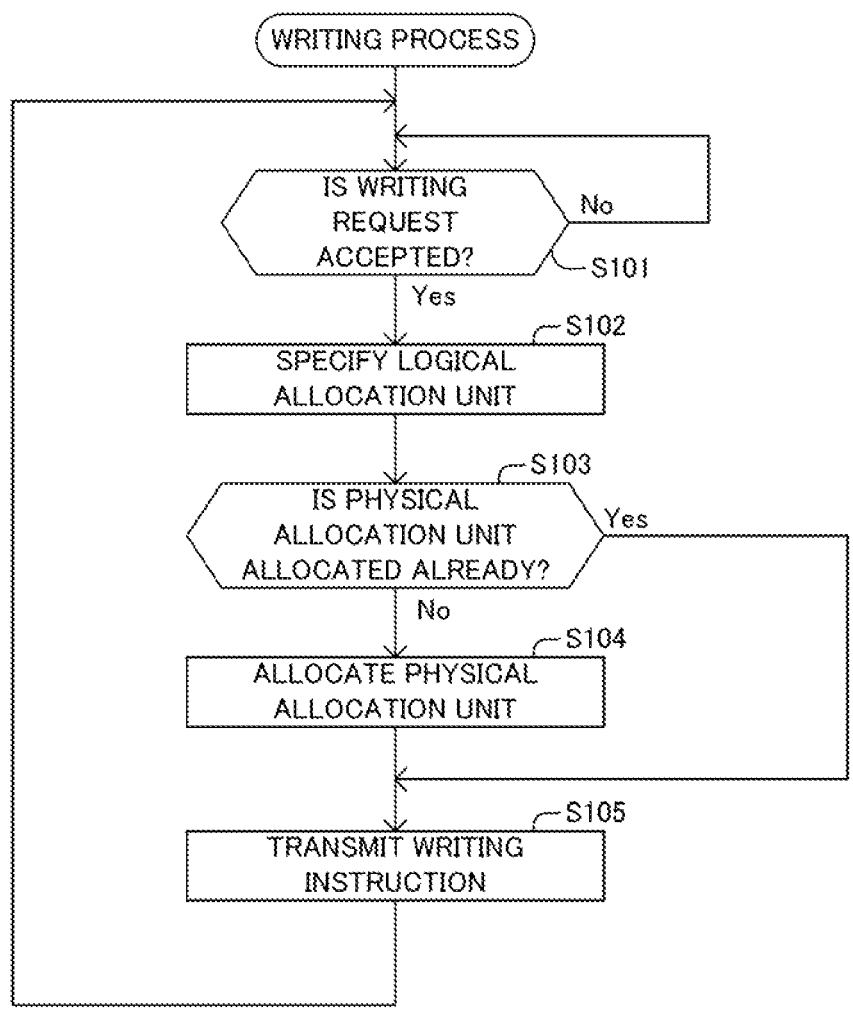

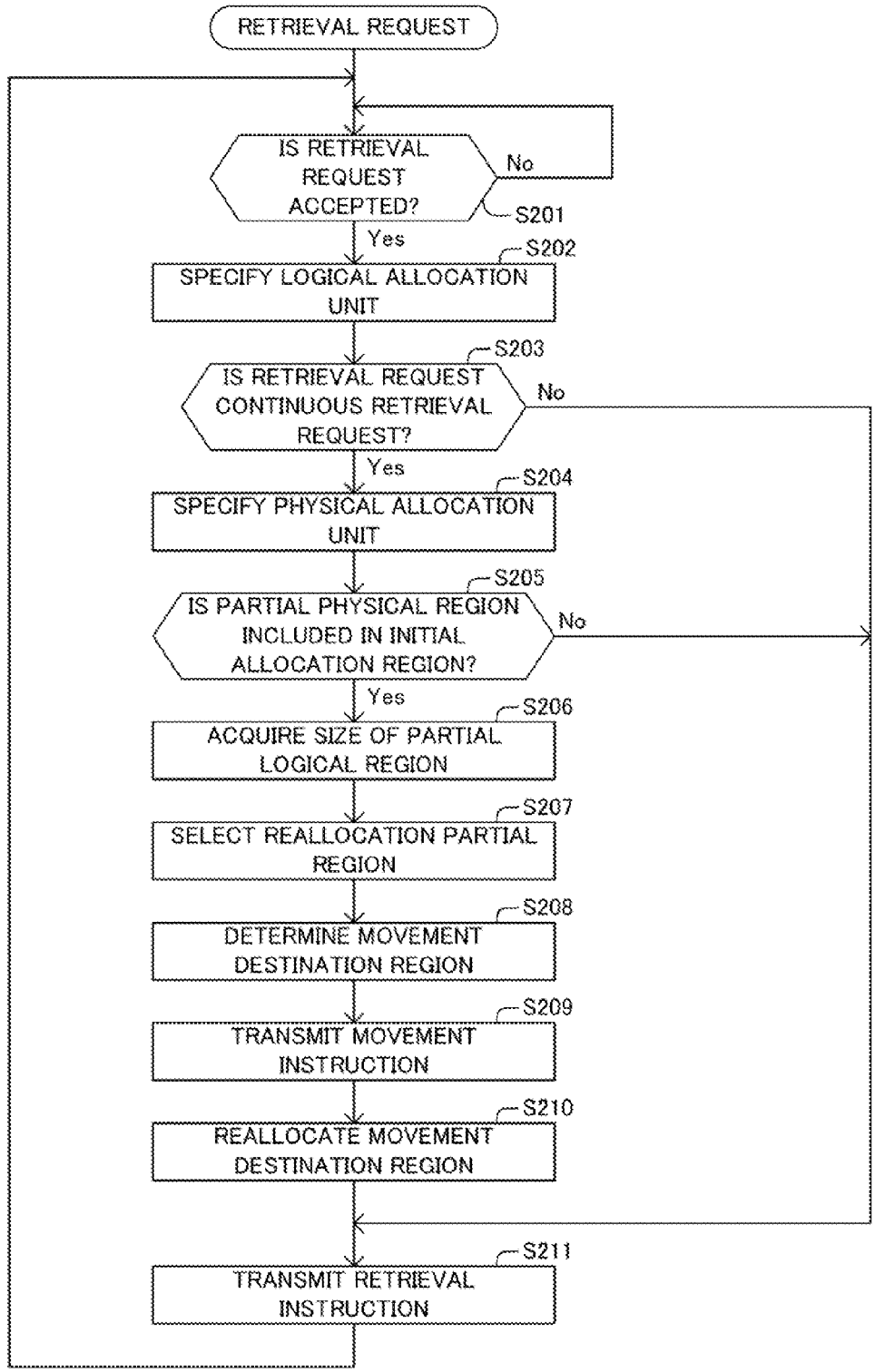

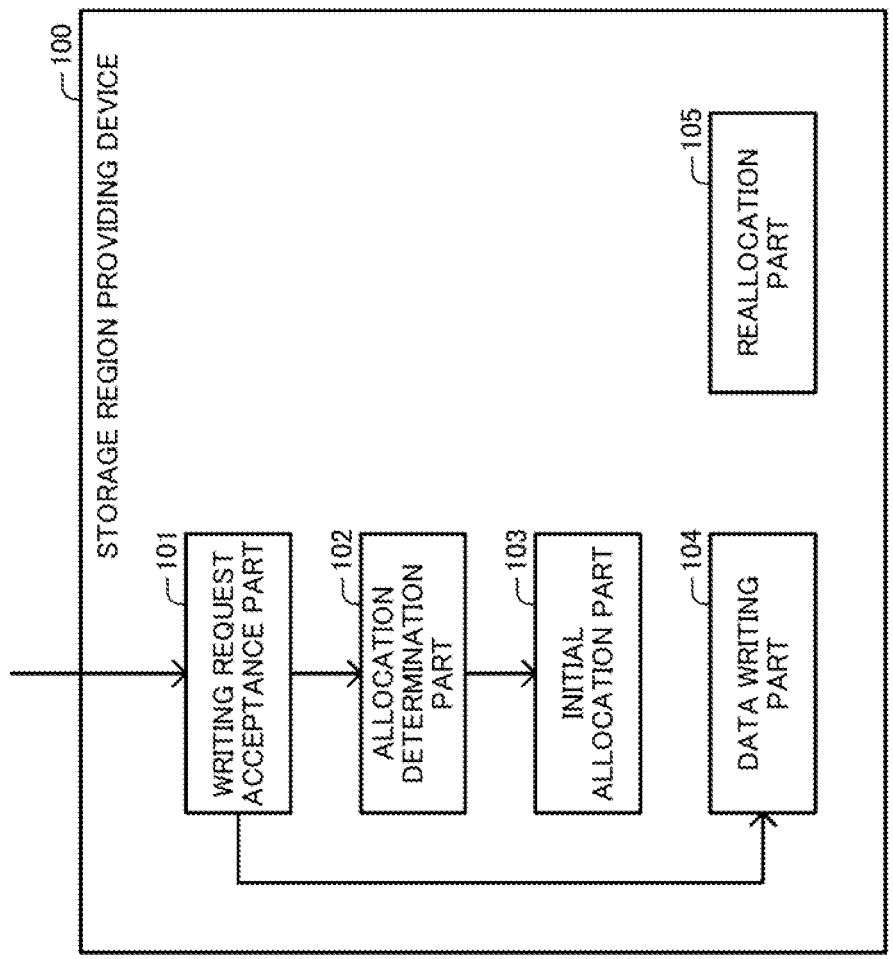

STORAGE REGION PROVIDING DEVICE, STORAGE REGION PROVIDING METHOD, AND RECORDING MEDIUM

INCORPORATION BY REFERENCE

This application is based upon and claims the benefit of priority from Japanese patent application No. 2010-223339, filed on Oct. 1, 2010, the disclosure of which is incorporated herein in its entirety by reference.

TECHNICAL FIELD

The present invention relates to a storage region providing device configured to provide a physical region that is a physical storage region of a storage device as a logical region that, is a virtual storage region.

BACKGROUND ART

A storage region providing device configured to provide a physical region that is a physical storage region of a storage device as a logical region that is a virtual storage region is known. As one of storage region providing devices of this type, a storage region providing device described in Patent Document 1 accepts a writing request. The writing request includes data and partial logical region specification information for specifying a partial logical region that is part of a logical region.

In a case that part of the physical region is not allocated yet to the partial logical region specified by the partial logical region specification information included in the writing request, the storage region providing device allocates part of the physical region (a partial physical region) to the partial logical region. Then, the storage region providing device stores the data into the partial physical region allocated to the partial logical region.

Thus, the storage region providing device allocates a partial physical region to a partial logical region (i.e., secures a physical region for a partial logical region) for the first time at a moment of actually storing (writing) data. Consequently, it is possible to prevent wasteful securing of a physical region that is not used actually. This function is called a thin provisioning (or a virtual provisioning) function.

[Patent Document 1] Japanese Unexamined Patent Application Publication No. JP-A 2010-86420

Every time accepting a writing request, the storage region providing device searches for a region that is not used (not allocated to any logical region) (an unallocated region) in the physical region, for example, from the beginning of the physical region, and allocates an unallocated region that is searched for at first to a partial logical region specified by the writing request.

A case in which partial logical regions composed of partial logical regions specified by partial logical region specification information included in a plurality of writing requests, respectively, are continuously located in the logical region (e.g., a case in which data configuring one file are stored by a plurality of writing requests) will be assumed. In this case, according to the storage region providing device described above, a state in which partial physical regions allocated to the partial logical regions are separately located in the physical region will be caused.

Thus, there is a fear that the speed of accessing the data stored in the storage device (e.g., retrieving the data configuring the file, changing the data configuring the file) excessively decreases.

SUMMARY

Accordingly, an object of the present invention is to provide a storage region providing device capable of solving the aforementioned problem, "the speed of accessing data stored in a storage device excessively decreases."

In order to achieve the object, a storage region providing device of an embodiment of the present invention is a device configured to provide a physical region that is a physical storage region of a storage device as a logical region that is a virtual storage region.

Moreover, this storage region providing device is equipped with:

a writing request acceptance unit configured to accept a writing request including data and partial logical region specification information for specifying a partial logical region that is part of the logical region;

an allocation determination unit configured to determine whether part of the physical region is already allocated to the partial logical region specified by the partial logical region specification information included in the accepted writing request;

an initial allocation unit configured to, in a case that part of the physical region is not yet allocated to the partial logical region specified by the partial logical region specification information included in the accepted writing request, allocate at least part of an initial allocation region of the physical region to the partial logical region;

a data writing unit configured to store the data included in the accepted writing request into a partial physical region that is part of the physical region and is allocated to the partial logical region specified by the partial logical region specification information included in the writing request; and a reallocation unit configured to move data stored in the partial physical region included in the initial allocation region to a movement destination region that is at least part of a reallocation region that is other than the initial allocation region of the physical region, and reallocate the movement destination region to the partial logical region with the partial physical region allocated.

Further, a storage region providing method of another embodiment of the present invention is a method for providing a physical region that is a physical storage region of a storage device as a logical region that is a virtual storage region.

Moreover, this storage region providing method is a method including:

accepting a writing request including data and partial logical region specification information for specifying a partial logical region that is part of the logical region;

determining whether part of the physical region is already allocated to the partial logical region specified by the partial logical region specification information included in the accepted writing request;

in a case that part of the physical region is not yet allocated to the partial logical region specified by the partial logical region specification information included in the accepted writing request, allocating at least part of an initial allocation region of the physical region to the partial logical region;

storing the data included in the accepted writing request into a partial physical region that is part of the physical region and is allocated to the partial logical region specified by the partial logical region specification information included in the writing request; and moving data stored in the partial physical region included in the initial allocation region to a movement destination region that is at least part of a reallocation region that is other than the initial allocation region of the physical region, and reallocating the movement destination region to the partial logical region with the partial physical region allocated.

Further, a recording medium of another embodiment of the present invention is a computer-readable recording medium that records a storage region providing program comprising instructions for causing an information processing device to provide a physical region that is a physical storage region of a storage device as a logical region that is a virtual storage region.

Moreover, this storage region providing program is a program including instructions for causing the information processing device to realize:

a writing request acceptance unit configured to accept a writing request including data and partial logical region specification information for specifying a partial logical region that is part of the logical region;

an allocation determination unit configured to determine whether part of the physical region is already allocated to the partial logical region specified by the partial logical region specification information included in the accepted writing request;

an initial allocation unit configured to, in a case that part of the physical region is not yet allocated to the partial logical region specified by the partial logical region specification information included in the accepted writing request, allocate at least part of an initial allocation region of the physical region to the partial logical region;

a data writing unit configured to store the data included in the accepted writing request into a partial physical region that is part of the physical region and is allocated to the partial logical region specified by the partial logical region specification information included in the writing request; and a reallocation unit configured to move data stored in the partial physical region included in the initial allocation region to a movement destination region that is at least part of a reallocation region that is other than the initial allocation region of the physical region, and reallocate the movement destination region to the partial logical region with the partial physical region allocated.

With the configurations of the present invention described above, it is possible to prevent excessive decrease of the speed of accessing data stored in a storage device.

BRIEF DESCRIPTION OF DRAWINGS

FIG. 3 is a table which is stored by the controller according to the first exemplary embodiment of the present invention, and which relates logical allocation unit identification information, start address information, end address information, and initial allocation information;

FIG. 4 is a table which is stored by the controller according to the first exemplary embodiment of the present invention, and which relates physical allocation unit identification information, start address information, end address information, and region identification information;

FIG. 5 is a table which is stored by the controller according to the first exemplary embodiment of the present invention, and which relates physical allocation unit identification information, initial allocation region information, and a physical allocation unit size;

FIG. 6 is a table which is stored by the controller according to the first exemplary embodiment of the present invention, and which relates logical allocation unit identification information and physical allocation unit identification information;

FIG. 7 is a flowchart showing a writing process program executed by the controller according to the first exemplary embodiment of the present invention;

FIG. 8 is a flowchart showing a retrieval process program executed by the controller according to the first exemplary embodiment of the present invention; and FIG. 9 is a block diagram schematically showing a function of a storage region providing device according to a second exemplary embodiment of the present invention.

EXEMPLARY EMBODIMENT

Below, respective exemplary embodiments of a storage region providing device, a storage region providing method and a recording medium according to the present invention will be described with reference to FIGS. 1 to 9.

First Exemplary Embodiment (Configuration)

Figure 1:
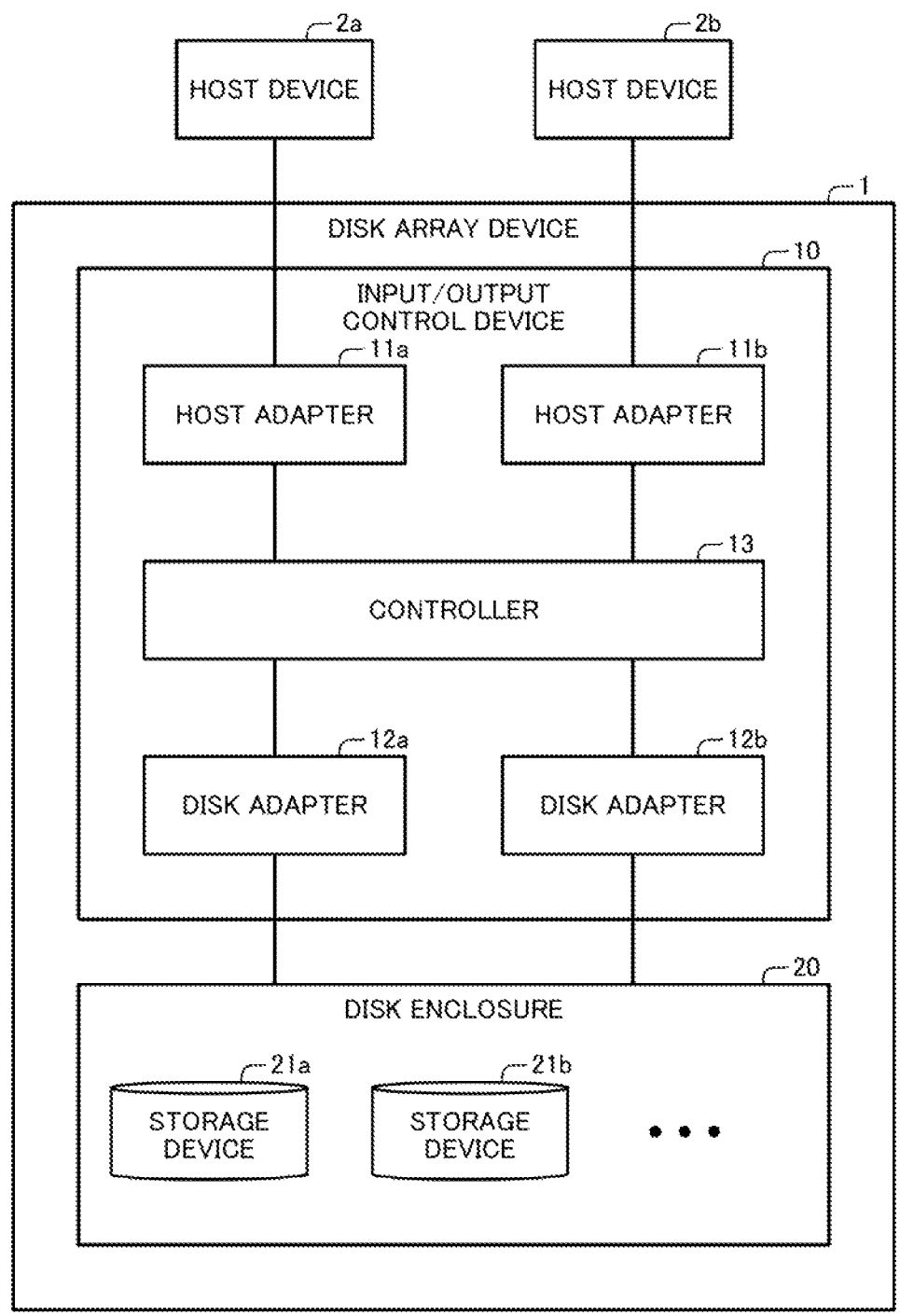
FIG. 1 is a diagram showing a schematic configuration of a disk array device according to a first exemplary embodiment of the present invention.

As shown in FIG. 1, a disk array device 1 according to a first exemplary embodiment is equipped with an input/output control device 10 and a disk enclosure 20. In this embodiment, the disk array device 1 has a thin provisioning (or virtual provisioning) function.

The input/output control device 10 is equipped with a plurality of (in this embodiment, two) host adapters 11a and 11b, a plurality of (in this embodiment, two) disk adapters 12a and 12b, and a controller 13.

The host adapter 11a is connected to a host device 2a and the controller 13. The host adapter 11a relays information (e.g., a writing request, a retrieval request and retrieval data, which will be described later) transmitted between the host device 2a and the controller 13 (transfers the information). Likewise, the host adapter 11b is connected to a host device 2b and the controller 13. The host adapter 11b relays information transmitted between the host device 2b and the controller 13.

The disk adapter 12a is connected to the disk enclosure 20 and the controller 13. The disk adapter 12a relays information (e.g., a writing request, a retrieval request and retrieval data, which will be described later) transmitted between the disk enclosure 20 and the controller 13. Likewise, the disk adapter 12b is connected to the disk enclosure 20 and the controller 13. The disk adapter 12b relays information transmitted between the disk enclosure 20 and the controller 13.

The controller 13 is equipped with a central processing unit (CPU) and a memory, which are not shown in the drawings. The controller 13 is configured to realize a function described later by execution of a program stored in the memory by the CPU.

The disk enclosure 20 is equipped with a plurality of storage devices 21a, 21b, etc. In this embodiment, the respective storage devices 21a, 21b, etc., are hard disk drives (HDD). The respective storage devices 21a, 21b, etc., may be solid state drives (or solid state disks; SSD).

The input/output control device 10 configures a storage region providing device providing a physical region that is a physical storage region of each of the plurality of storage devices 21a, 21b, etc., included by the disk enclosure 20, as a logical region that is a virtual storage region.

The host device 2a is an information processing device. The host device 2a outputs a writing request and a retrieval request.

A writing request is information including data (writing data) and partial logical region specification information for specifying a partial logical region that is part of the logical region. The writing request is information of a request to write (store) the writing data into a partial physical region related to the partial logical region specified by the partial logical region specification information.

A retrieval request is information including partial logical region specification information for specifying a partial logical region that is part of the logical region. The retrieval request is information of a request to retrieve data (retrieval data) stored in a partial physical region related to the partial logical region specified by the partial logical region specification information.

In this embodiment, the retrieval request is a continuous retrieval request or a discontinuous retrieval request.

The continuous retrieval request includes partial logical region specification information for specifying a partial logical region that is a continuous region in the logical region. The discontinuous retrieval request includes partial logical region specification information for specifying a partial logical region that is a disorder (random) region in the logical region.

(Function)

Figure 2:
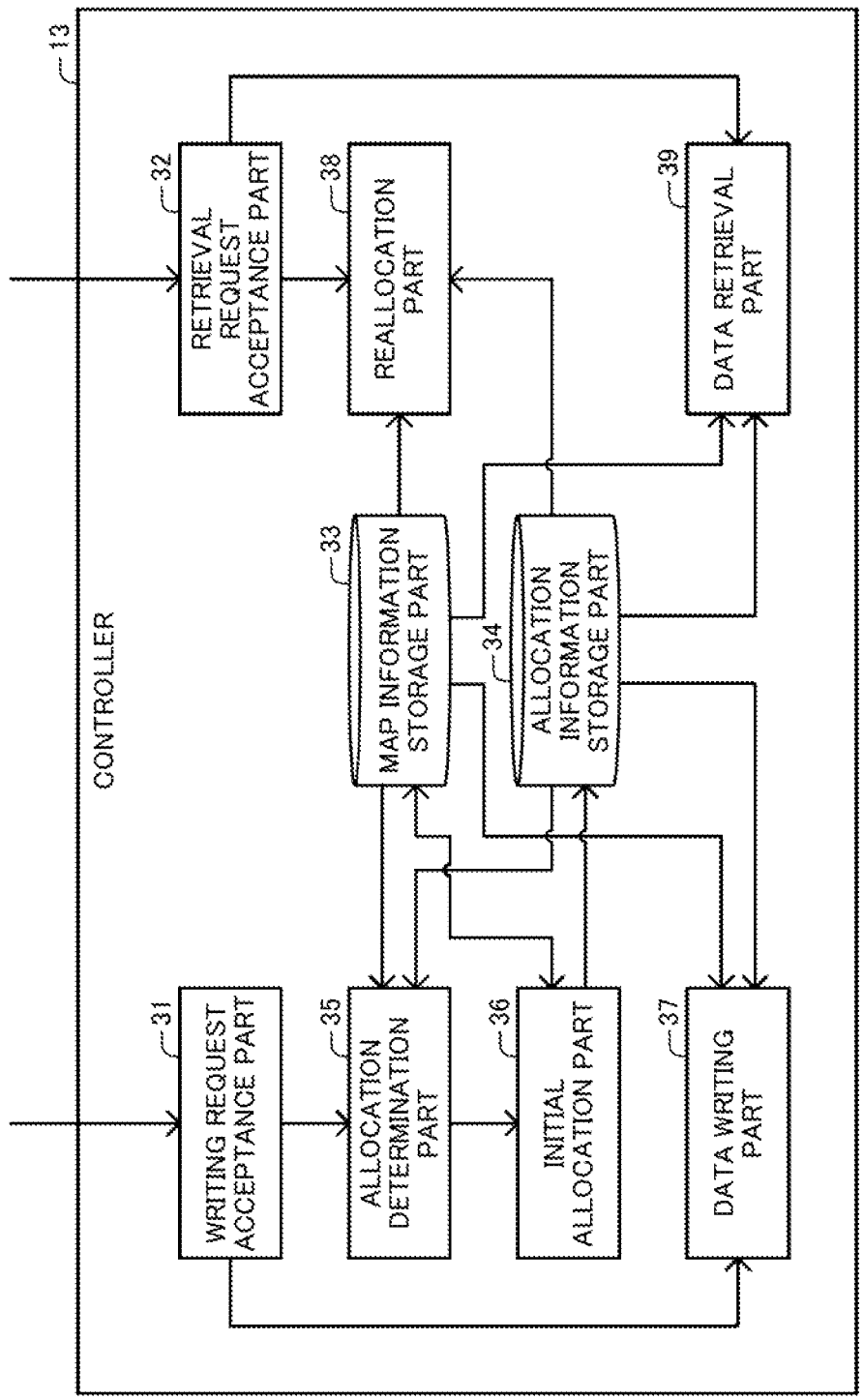
FIG. 2 is a block diagram schematically showing a function of a controller according to the first exemplary embodiment of the present invention.

FIG. 2 is a block diagram showing a function of the controller 13 configured as described above.

The function of the controller 13 includes a writing request acceptance part (a writing request acceptance means) 31, a retrieval request acceptance part (a retrieval request acceptance means) 32, a map information storage part (an initial allocation information storage means) 33, an allocation information storage part (an allocation information storage means) 34, an allocation determination part (an allocation determination means) 35, an initial allocation part (an initial allocation means) 36, a data writing part (a data writing means) 37, a reallocation part (a reallocation means) 38, and a data retrieval part (a data retrieval means) 39.

The writing request acceptance part 31 accepts a writing request from the host device 2a, 2b via the host adaptor 11a, 11b.

The retrieval request acceptance part 32 accepts a retrieval request from the host device 2a, 2b via the host adaptor 11a, 11b.

In this embodiment, the logical region is configured by a plurality of logical allocation units. Each of the logical allocation units has a preset size. In this embodiment, a partial logical region specified by partial logical region specification information included in a writing request is composed of at least one logical allocation unit.

Further, the physical region is configured by a plurality of physical allocation units. Moreover, in the physical region, a plurality of partial regions are preset. The plurality of partial regions include physical allocation units of different sizes, respectively.

In this embodiment, a partial region in which the size of the physical allocation unit is the smallest configures an initial allocation region. Moreover, each of partial regions other than the initial allocation region configures a reallocation partial region. The partial regions other than the initial allocation region (i.e., a plurality of reallocation partial regions) configure a reallocation region. In other words, it is possible to say that the reallocation region includes a plurality of reallocation partial regions including physical allocation units of different sizes, respectively. Moreover, it is also possible to say that the size of the physical allocation units configuring the initial allocation region is equal to or less than the size of the physical allocation units configuring the reallocation region.

To be specific, as shown in FIG. 3, the map information storage part 33 stores logical allocation unit identification information, start address information, end address information and initial allocation information in a related manner.

Logical allocation unit identification information is information for identifying a logical allocation unit. Start address information is information representing a position (an address) at which the logical allocation unit starts in the logical region. End address information is information representing a position at which the logical allocation unit ends in the logical region. Initial allocation information is information representing whether a physical allocation unit allocated to the logical allocation unit is included in the initial allocation region.

Furthermore, as shown in FIG. 4, the map information storage part 33 stores physical allocation unit identification information, start address information, end address information, and end identification information in a related manner.

Physical allocation unit identification information is information for identifying a physical allocation unit. Start address information is information representing a position (an address) at which the physical allocation unit starts in the physical region. End address information is information representing a position at which the physical allocation unit ends in the physical region. Region identification information is information for identifying a partial region including the physical allocation unit (the initial allocation region, or the reallocation partial region).

In addition, as shown in FIG. 5, the map information storage part 33 stores the region identification information, initial allocation region information and a physical allocation unit size in a related manner.

Initial allocation region information is information representing whether the partial region identified by the region identification information is the initial allocation region. A physical allocation unit size is information representing the size of the physical allocation unit included in the partial region identified by the region identification information.

As shown in FIG. 6, the allocation information storage part 34 stores the logical allocation unit identification information and the physical allocation unit identification information in a related manner. In this embodiment, storing the physical allocation unit identification information so as to be related to the logical allocation unit identification information by the allocation information storage part 34 corresponds to allocation of the physical allocation unit identified by the physical allocation unit identification information to the logical allocation unit identified by the logical allocation unit identification information.

In other words, it is possible to say that the input/output control device 10 allocates part of the physical region to part of the logical region by allocating the physical allocation unit to the logical allocation unit.

The allocation determination part 35 determines whether part of the physical region is already allocated to a partial logical region specified by partial logical region specification information included in a writing request accepted by the writing request acceptance part 31.

To be specific, in a case that physical allocation unit identification information is stored in the allocation information storage part 34 so as to be related to logical allocation unit identification information for identifying a logical allocation unit configuring a partial logical region, the allocation determination part 35 determines that part of the physical region is already allocated to the partial logical region. On the other hand, in a case that physical allocation unit identification information is not stored in the allocation information storage part 34 so as to be related to logical allocation unit identification information for identifying a logical allocation unit configuring a partial logical region, the allocation determination part 35 determines that part of the physical region is not allocated to the partial logical region yet.

In a case that it is determined by the allocation determination part 35 that part of the physical region is not allocated to a partial logical region specified by partial logical region specification information included in a writing request accepted by the writing request acceptance part 31 yet, the initial allocation part 36 allocates at least part of the initial allocation region in the physical region to the partial logical region.

To be specific, the initial allocation part 36 specifies a physical allocation unit included in the initial allocation region among physical allocation units that are not allocated to any logical allocation units, based on the information stored in the map information storage part 33 and the allocation information storage part 34.

Then, the initial allocation part 36 allocates the specified physical allocation unit to the partial logical region specified by the partial logical region specification information included in the writing request. That is to say, the initial allocation part 36 stores physical allocation unit identification information for identifying the specified physical allocation unit and logical allocation unit identification information for identifying a logical allocation unit configuring the partial logical region, into the allocation information storage part 34.

The data writing part 37 executes a process for storing data included in a writing request accepted by the writing request acceptance part into a partial physical region that is part of the physical region allocated to a partial logical region specified by partial logical region specification information included in the writing request.

To be specific, the data writing part 37 specifies a physical allocation unit allocated to a logical allocation unit configuring the partial logical region specified by the partial logical region specification information included in the writing request, based on the information stored in the map information storage part 33 and the allocation information storage part 34. Then, the data writing part 37 transmits a writing instruction of instructing to store the data included in the writing request into the specified physical allocation unit, to the disk enclosure 20 via the disk adapter 12a, 12b.

The reallocation part 38 moves data stored in a partial physical region included in the initial allocation region (i.e., a region composed of a physical allocation unit configuring the initial allocation region) to a movement destination region that is at least part of a reallocation region (i.e., a region composed of a physical allocation unit configuring the reallocation region), and reallocates the movement destination region to a partial logical region to which the partial physical region is allocated.

To be specific, the reallocation part 38 determines whether a partial physical region allocated to a partial logical region specified by partial logical region specification information included in a retrieval request accepted by the retrieval request acceptance part 32 is included in the initial allocation region.

In this embodiment, in a case that initial allocation information representing that a physical allocation unit allocated to a logical allocation unit configuring a partial logical region is included in the initial allocation region is stored in the map information storage part 33 so as to be related to logical allocation unit identification information for identifying the logical allocation unit, the reallocation part 38 determines that a partial physical region allocated to the partial logical region is included in the initial allocation region.

Then, in the case of determining that the partial physical region allocated to the partial logical region specified by the partial logical region specification information included in the retrieval request is included in the initial allocation region, the reallocation part 38 acquires the size of the partial logical region. Next, the reallocation part 38 selects one of the plurality of reallocation partial regions based on the acquired size of the partial logical region. In this embodiment, the reallocation part 38 selects one of the plurality of reallocation partial regions based on a preset relation between the size of a partial logical region and the size of a physical allocation unit and based on the size of the acquired partial logical region.

Then, the reallocation part 38 specifies a partial physical region composed of a physical allocation unit included in the selected reallocation partial region among the physical allocation units that are not allocated to any logical allocation units, as a movement destination region. At this moment, the reallocation part 38 determines (specifies) a movement destination region so that the movement destination region is continuous located over the acquired size of the partial logical region.

Next, the reallocation part 38 moves data stored in the partial physical region allocated to the partial logical region specified by the partial logical region specification information included in the retrieval request, to the determined movement destination region (i.e., a region composed of a physical allocation unit configuring the reallocation region). To be specific, the reallocation part 38 transmits a movement instruction of instructing to move the data to the determined movement destination region, to the disk enclosure 20 via the disk adapter 12a, 12b.

Furthermore, the reallocation part 38 reallocates the movement destination region to the partial logical region. To be specific, the reallocation part 38 deletes logical allocation unit identification information for identifying a logical allocation unit configuring the partial logical region and physical allocation unit identification information stored so as to be related to the logical allocation unit identification information, from the allocation information storage part 34. In addition, the reallocation part 38 stores physical allocation unit identification information for identifying a physical allocation unit configuring the movement destination region and logical allocation unit identification information for identifying a logical allocation unit configuring the partial logical region, into the allocation information storage part 34.

The data retrieval part 39 retrieves data stored in a partial physical region that is part of the physical region and is allocated to a partial logical region specified by partial logical region specification information included by a retrieval request accepted by the retrieval request acceptance part 32.

To be specific, the data retrieval part 39 specifies a physical allocation unit allocated to a logical allocation unit configuring the partial logical region specified by the partial logical region specification information included in the retrieval request, based on the information stored by the map information storage part 33 and the allocation information storage part 34. Then, the data retrieval part 39 transmits a retrieval instruction of instructing to retrieve data stored in the specified physical allocation unit, to the disk enclosure 20 via the disk adapter 12a, 12b.

(Operation)

Next, an operation of the disk array device 1 described above will be explained.

The CPU of the controller 13 executes a writing process program shown by a flowchart in FIG. 7.

To be specific, upon starting the writing process program, the controller 13 stands by until accepting a writing request (step S101). When the controller 13 accepts a writing request from the host device 2a, 2b via the host adapter 11a, 11b, the controller 13 proceeds to step S102 and specifies a logical allocation unit configuring a partial logical region specified by partial logical region specification information included in the writing request.

Next, the controller 13 determines whether a physical allocation unit is already allocated to the specified logical allocation unit (step S103).

In a case that a physical allocation unit is already allocated to the logical allocation unit, the controller 13 determines 'Yes' and proceeds to step S105.

On the other hand, in a case that a physical allocation unit is not allocated to the logical allocation unit yet, the controller 13 determines 'No' and proceeds to step S104. Then, the controller 13 specifies a physical allocation unit included in the initial allocation region among physical allocation units that are not allocated to any logical allocation units, and allocates the specified physical allocation unit to the abovementioned logical allocation unit (step S104).

Next, at step S105, the controller 13 transmits a writing instruction of instructing to store data included in the writing request into the physical allocation unit allocated to the abovementioned logical allocation unit, to the disk enclosure 20 via the disk adapter 12a, 12b.

Consequently, the disk enclosure 20 receives the writing instruction from the controller 13. Then, the disk enclosure 20 stores the data into the storage device 21a, 21b, etc., in accordance with the received writing instruction.

After that, the controller 13 returns to step S101 and repeatedly executes the process from step S101 to step S105.

Further, the CPU of the controller 13 executes a retrieval process program shown by a flowchart in FIG. 8.

To be specific, upon starting a process of the retrieval process program, the controller 13 stands by until accepting a retrieval request (step S201). When the controller 13 accepts a retrieval request from the host device 2a, 2b via the host adapter 11a, 11b, the controller 13 proceeds to step S202 and specifies a logical allocation unit configuring a partial logical region specified by partial logical region specification information included in the retrieval request.

Next, the controller 13 determines whether the retrieval request is a continuous retrieval request (step S203).

In a case that the retrieval request is not a continuous retrieval request, the controller 13 determines 'No' and proceeds to step S211.

On the other hand, in a case that the retrieval request is a continuous retrieval request, the controller 13 determines 'Yes' and proceeds to step S204. Then, the controller 13 specifies a physical allocation unit allocated to the abovementioned logical allocation unit.

Next, the controller 13 determines whether a partial physical region composed of the specified physical allocation unit is included in the initial allocation region (step S205).

In a case that the abovementioned partial physical region is not included in the initial allocation region, the controller 13 determines 'No' and proceeds to step S211.

On the other hand, in a case that the abovementioned partial physical region is included in the initial allocation region, the controller 13 determines 'Yes' and proceeds to step S206. Then, the controller 13 acquires the size of the abovementioned partial logical region. Next, the controller 13 selects one of the plurality of reallocation partial regions based on the acquired size of the partial logical region (step S207).

Then, the controller 13 determines a partial physical region composed of a physical allocation unit included in the selected reallocation partial region among physical allocation units that are not allocated to any logical allocation units, as a movement destination region (step S208). At this moment, the controller 13 determines (specifies) a movement destination region so that the movement destination region is continuous over the acquired size of the partial logical region.

Next, the controller 13 transmits a movement instruction of instructing to move data stored in the partial physical region allocated to the partial logical region specified by the partial logical region specification information included in the retrieval request to the determined movement destination region, to the disk enclosure 20 via the disk adapter 12a, 12b (step S209).

Consequently, the disk enclosure 20 receives the movement instruction from the controller 13. Then, the disk enclosure 20 moves data stored in the storage device 21a, 21b, etc., in accordance with the received movement instruction.

After that, at step S210, the controller 13 reallocates the determined movement destination region to the partial logical region specified by the partial logical region specification information included in the retrieval request (executes reallocation).

Then, the controller 13 transmits a retrieval instruction of instructing to retrieve the data stored in the physical allocation unit allocated to the logical allocation unit specified at step S202, to the disk enclosure 20 via the disk adapter 12a, 12b (step S211).

Consequently, the disk enclosure 20 receives the retrieval instruction from the controller 13. Then, the disk enclosure 20 retrieves data stored in the storage device 21a, 21b, etc., in accordance with the received retrieval instruction. Next, the disk enclosure 20 transmits the retrieved data (retrieval data) to the input/output control device 10.

The input/output control device 10 receives the retrieval data from the disk enclosure 20, and transmits the received retrieval data to the host device 2a, 2b.

After that, the controller 13 returns to step S201, and repeatedly executes the process from step S201 to step S211.

As described above, the input/output control device 10 (the storage region providing device) according to the first exemplary embodiment of the present invention allocates at least part of the initial allocation region to a partial logical region specified by a writing request. After that, the input/output control device 10 moves data stored in at least part of the initial allocation region to at least part of the reallocation region. Therefore, according to the input/output control device 10, a state in which the amount of data stored in the initial allocation region is relatively small is maintained.

A case in which partial logical regions composed of partial logical regions specified by partial logical region specification information included in a plurality of writing requests, respectively, are continuously located in the logical region (e.g., a case in which data configuring one file are stored by a plurality of writing requests) will be assumed. In this case, according to the input/output control device 10, it is possible to increase a possibility that partial physical regions that are continuously located in the physical region can be allocated to partial logical regions that are continuously located in the logical region.

Further, when stored data is retrieved, the input/output control device 10 acquires the size of data that should be continuously located. Moreover, when moving data stored in the storage device 21a, 21b, etc., from the initial allocation region to the reallocation region, the input/output control device 10 determines a movement destination region based on the size acquired as the size of the data that should be continuously located. Consequently, it is possible to increase a possibility that the data can be stored into a continuous partial physical region.

Thus, according to the configuration described above, it is possible to decrease a possibility that a partial physical region allocated to a partial logical region continuous in the logical region is separately located in the physical region. As a result, it is possible to prevent excessive decrease of the speed of accessing data stored in the storage device 21*a*, 21*b*, etc. (e.g., retrieving the data, changing the data).

Furthermore, in the input/output control device 10 according to the first exemplary embodiment of the present invention, the size of a physical allocation unit configuring the initial allocation region is equal to or less than the size of a physical allocation unit configuring the reallocation region.

There is a case that part of a plurality of addresses configuring a physical allocation unit allocated to a logical allocation unit does not store data (i.e., is not used) actually. Therefore, as the size of the physical allocation unit becomes larger, a possibility that the number of the unused addresses becomes too large (i.e., a wastefully allocated physical region becomes too large) increases.

By configuring the input/output control device 10 as described above, it is possible to prevent a wastefully allocated physical region from becoming too large in the initial allocation region. As a result, it is possible to make a physical region that can be newly allocated in the initial allocation region large enough.

In addition, the input/output control device 10 according to the first exemplary embodiment of the present invention selects one of a plurality of reallocation partial regions including physical allocation units of different sizes, respectively, based on the size of a partial logical region specified by partial logical region specification information included in an accepted retrieval request. Moreover, the input/output control device 10 reallocates at least part of the selected reallocation partial region to the partial logical region.

According to this, it is possible to access data stored in the storage device 21*a*, 21*b*, etc., at high speeds, and it is also possible to prevent a physical region wastefully allocated to a partial logical region from becoming too large.

Furthermore, the input/output control device 10 according to the first exemplary embodiment of the present invention determines whether a partial physical region allocated to a partial logical region is included in an initial allocation region, based on initial allocation information stored so as to be related to logical allocation unit identification information.

According to this, it is possible to quickly determine whether a partial physical region allocated to a partial logical region is included in the initial allocation region.

In the disk array device 1 according to a modified example of the first exemplary embodiment of the present invention, a random retrieval speed, which is a speed of retrieving data from a plurality of partial regions located at random, may vary with the plurality of storage devices 21*a*, 21*b*, etc. In other words, it is possible to say that, in the disk array device 1, the physical region is configured by storage regions of the plurality of storage devices 21*a*, 21*b*, etc., having different random retrieval speeds.

In this case, it is preferred that the initial allocation region is configured by the storage region of the storage device 21*a*, 21*b*, etc., having the highest random retrieval speed. The random retrieval speed of an SSD (Solid State Drive) is higher than that of an HDD (Hard Disk Drive). Therefore, for example, it is preferred that the initial allocation region is configured by a storage region of an SSD and the reallocation region is configured by a storage region of an HDD.

According to this, even if a partial physical region allocated to a partial logical region is discontinuously located in the initial allocation region, it is possible to quickly access data stored in the partial physical region.

Second Exemplary Embodiment

Next, a storage region providing device according to a second exemplary embodiment of the present invention will be described with reference to FIG. 9.

A storage region providing device 100 according to the second exemplary embodiment is a device configured to provide a physical region that is a physical storage region of a storage device as a logical region that is a virtual storage region.

Further, this storage region providing device 100 is equipped with:

a writing request acceptance part (a writing request acceptance means) 101 configured to accept a writing request including data and partial logical region specification information for specifying a partial logical region that is part of the logical region;

an allocation determination part (an allocation determination means) 102 configured to determine whether part of the physical region is already allocated to the partial logical region specified by the partial logical region specification information included in the accepted writing request;

an initial allocation part (an initial allocation means) 103 configured to, in a case that part of the physical region is not yet allocated to the partial logical region specified by the partial logical region specification information included in the accepted writing request, allocate at least part of an initial allocation region of the physical region to the partial logical region;

a data writing part (a data writing means) 104 configured to store the data included in the accepted writing request into a partial physical region that is part of the physical region and is allocated to the partial logical region specified by the partial logical region specification information included in the writing request; and a reallocation part (a reallocation means) 105 configured to move data stored in the partial physical region included in the initial allocation region to a movement destination region that is at least part of a reallocation region that is other than the initial allocation region of the physical region, and reallocate the movement destination region to the partial logical region with the partial physical region allocated.

Thus, the storage region providing device 100 allocates at least part of an initial allocation region to a partial logical region specified by a writing request. After that, the storage region providing device 100 moves data stored in at least the part of the initial allocation region to at least part of a reallocation region. Therefore, according to the storage region providing device 100, a state in which the amount of the data stored in the initial allocation region is relatively small is maintained.

A case in which partial logical regions composed of partial logical regions specified by partial logical region specification information included in a plurality of writing requests, respectively, are continuously located in a logical region (e.g., a case in which data configuring one file are stored by a plurality of writing requests) will be assumed. In this case, according to the storage region providing device 100, it is possible to increase a possibility that a partial physical region continuously located in a physical region can be allocated to the partial logical region continuously located in the logical region.

Further, for example, when stored data is retrieved, there is a case that the size of data that should be continuously located can be acquired. Therefore, when moving data stored in the storage device from the initial allocation region to the reallocation region, by determining a movement destination region based on the size acquired as the size of the data that should be continuously located, it is possible to increase a possibility that the data can be stored into a continuously located partial physical region.

Thus, according to the configuration described above, it is possible to decrease a possibility that a partial physical region allocated to a partial logical region continuously located in a logical region is separately located in a physical region. As a result, it is possible to prevent excessive decrease of the speed of accessing data stored in the storage device (e.g., retrieving the data, changing the data).

Although the present invention has been described with reference to the respective exemplary embodiments described above, the present invention is not limited to the exemplary embodiments described above. The configuration and details of the present invention can be altered within the scope of the present invention in various manners that can be understood by those skilled in the art.

In the respective exemplary embodiments described above, the respective functions of the controller 13 or the storage region providing device are realized by execution of a program (software) by the CPU, but may be realized by hardware such as a circuit.

Further, in the respective exemplary embodiments described above, the program is stored in the storage device, but may be stored in a computer-readable storage medium. For example, the storage medium is a portable medium such as a flexible disk, an optical disk, a magneto-optical disk and a semiconductor memory.

Further, as another modified example of the exemplary embodiments described above, any combination of the exemplary embodiments and modified examples described above may be employed.

<Supplementary Notes>

The whole or part of the exemplary embodiments disclosed above can be described as, but not limited to, the following supplementary notes.

(Supplementary Note 1)

A storage region providing device configured to provide a physical region that is a physical storage region of a storage device as a logical region that is a virtual storage region, the storage region providing device comprising:

a writing request acceptance unit configured to accept a writing request including data and partial logical region specification information for specifying a partial logical region that is part of the logical region;

an allocation determination unit configured to determine whether part of the physical region is already allocated to the partial logical region specified by the partial logical region specification information included in the accepted writing request;

an initial allocation unit configured to, in a case that part of the physical region is not yet allocated to the partial logical region specified by the partial logical region specification information included in the accepted writing request, allocate at least part of an initial allocation region of the physical region to the partial logical region;

a data writing unit configured to store the data included in the accepted writing request into a partial physical region that is part of the physical region and is allocated to the partial logical region specified by the partial logical region specification information included in the writing request; and a reallocation unit configured to move data stored in the partial physical region included in the initial allocation region to a movement destination region that is at least part of a reallocation region that is other than the initial allocation region of the physical region, and reallocate the movement destination region to the partial logical region with the partial physical region allocated.

Thus, the storage region providing device allocates at least part of an initial allocation region to a partial logical region specified by a writing request. After that, the storage region providing device moves data stored in at least part of the initial allocation region to at least part of a reallocation region. Therefore, according to the storage region providing device described above, a state in which the amount of the data stored in the initial allocation region is relatively small is maintained.

A case in which partial logical regions composed of partial logical regions specified by partial logical region specification information included in a plurality of writing requests, respectively, are continuously located in a logical region (e.g., a case in which data configuring one file are stored by a plurality of writing requests) will be assumed. In this case, according to the storage region providing device, it is possible to increase a possibility that partial physical regions continuously located in a physical region can be allocated to the partial logical regions continuously located in the logical region.

Further, for example, when the stored data is retrieved, there is a case that the size of data that should be continuously located can be acquired. Therefore, at the time of moving the data stored in the storage device from the initial allocation region to the reallocation region, by determining a movement destination region based on the size acquired as the size of the data that should be continuously located, it is possible to increase a possibility that the data can be stored into the continuously located partial physical regions.

Thus, according to the configuration described above, it is possible to decrease a possibility that the partial physical regions allocated to the partial logical regions continuously located in the logical region are separately located in the physical region. As a result, it is possible to prevent excessive decrease of the speed of accessing the data stored in the storage device (e.g., retrieving the data, changing the data).

(Supplementary Note 2)

The storage region providing device according to supplementary note 1, comprising a retrieval request acceptance unit configured to accept a retrieval request including partial logical region specification information for specifying a partial logical region that is part of the logical region and is a continuous region in the logical region, wherein the reallocation unit is configured to, in a case that a partial physical region, which is part of the physical region and allocated to the partial logical region specified by the partial logical region specification information included in the accepted retrieval request, is included in the initial allocation region, acquire a size of the partial logical region and determine the movement destination region so that the movement destination region is continuous over the acquired size.

(Supplementary Note 3)

The storage region providing device according to supplementary note 1 or 2, wherein:

the physical region is composed of a plurality of physical allocation units;

the logical region is composed of a plurality of logical allocation units;

the storage region providing device is configured to allocate part of the physical region to part of the logical region by allocating the physical allocation unit to the logical allocation unit; and a size of the physical allocation unit composing the initial allocation region is equal to or less than a size of the physical allocation unit composing the reallocation region.

There is a case in which part of a plurality of addresses configuring a physical allocation unit allocated to a logical allocation unit does not store data (i.e., are not used) actually. Therefore, as the size of the physical allocation unit becomes larger, a possibility that the number of the unused addresses becomes excessively large (i.e., a wastefully allocated physical region becomes excessively large) increases.

Then, by configuring the storage region providing device as described above, it is possible to prevent a wastefully allocated physical region from becoming excessively large in the initial allocation region. As a result, it is possible to make a physical region that can be newly allocated in the initial allocation region large enough.

(Supplementary Note 4)

The storage region providing device according to supplementary note 3 wherein:

the reallocation region includes a plurality of reallocation partial regions each composed of the physical allocation unit, and a size of the physical allocation unit is different depending on the reallocation partial regions; and the reallocation unit is configured to, in a case that the partial physical region allocated to the partial logical region specified by the partial logical region specification information included in the accepted retrieval request is included in the initial allocation region, select one of the plurality of reallocation partial regions based on a size of the partial logical region, and reallocate at least part of the selected reallocation partial region to the partial logical region.

According to this, it is possible to access the data stored in the storage device at high speeds, and it is possible to prevent a physical region wastefully allocated to the partial logical region from becoming excessively large.

(Supplementary Note 5)

The storage region providing device according to supplementary note 3 or 4, comprising an allocation information storage unit configured to store logical allocation unit identification information for identifying the logical allocation unit and physical allocation unit identification information for identifying the physical allocation unit allocated to the logical allocation unit so as to be related to each other, wherein the allocation determination unit is configured to, in a case that the physical allocation unit identification information is stored so as to be related to the logical allocation unit identification information for identifying the logical allocation unit composing the partial logical region, determine that part of the physical region is already allocated to the partial logical region.

(Supplementary Note 6)

The storage region providing device according to any of supplementary notes 3 to 5, comprising an initial allocation information storage unit configured to store logical allocation unit identification information for identifying the logical allocation unit and initial allocation information representing whether the physical allocation unit allocated to the logical allocation unit is included in the initial allocation region so as to be related to each other, wherein the reallocation unit is configured to, in a case that the initial allocation information representing that the physical allocation unit allocated to the logical allocation unit is included in the initial allocation region is stored so as to be related to the logical allocation unit identification information for identifying the logical allocation unit composing the partial logical region, determine that the partial physical region allocated to the partial logical region is included in the initial allocation region.

According to this, it is possible to quickly determine whether a partial physical region allocated to a partial logical region is included in the initial allocation region.

(Supplementary Note 7)

The storage region providing device according to any of supplementary notes 1 to 6, wherein:

the physical region is configured by storage regions of a plurality of storage devices each having a different random retrieval speed depending on the storage devices, the random retrieval speed being a speed of retrieval of data from a plurality of partial regions located at random, and the initial allocation region is configured by a storage region of the storage device having the highest random retrieval speed among the plurality of storage devices.

According to this, even if partial physical regions allocated to partial logical regions are discontinuously located in the initial allocation region, it is possible to quickly access data stored in the partial physical regions.

(Supplementary Note 8)

A storage region providing method for providing a physical region that is a physical storage region of a storage device as a logical region that is a virtual storage region, the storage region providing method comprising:

accepting a writing request including data and partial logical region specification information for specifying a partial logical region that is part of the logical region;

determining whether part of the physical region is already allocated to the partial logical region specified by the partial logical region specification information included in the accepted writing request;

in a case that part of the physical region is not yet allocated to the partial logical region specified by the partial logical region specification information included in the accepted writing request, allocating at least part of an initial allocation region of the physical region to the partial logical region;

storing the data included in the accepted writing request into a partial physical region that is part of the physical region and is allocated to the partial logical region specified by the partial logical region specification information included in the writing request; and moving data stored in the partial physical region included in the initial allocation region to a movement destination region that is at least part of a reallocation region that is other than the initial allocation region of the physical region, and reallocating the movement destination region to the partial logical region with the partial physical region allocated.

(Supplementary Note 9)

The storage region providing method according to supplementary note 8, comprising:

accepting a retrieval request including partial logical region specification information for specifying a partial logical region that is part of the logical region and is a continuous region in the logical region; and in a case that a partial physical region which is part of the physical region and allocated to the partial logical region specified by the partial logical region specification information included in the accepted retrieval request, is included in the initial allocation region, acquiring a size of the partial logical region and determining the movement destination region so that the movement destination region is continuous over the acquired size.

(Supplementary Note 10)

The storage region providing method according to supplementary note 8 or 9, wherein:

the physical region is composed of a plurality of physical allocation units;

the logical region is composed of a plurality of logical allocation units;

the storage region providing method comprises allocating part of the physical region to part of the logical region by allocating the physical allocation unit to the logical allocation unit; and a size of the physical allocation unit composing the initial allocation region is equal to or less than a size of the physical allocation unit composing the reallocation region.

(Supplementary Note 11)

A computer-readable recording medium that records a storage region providing program comprising instructions for causing an information processing device to provide a physical region that is a physical storage region of a storage device as a logical region that is a virtual storage region, wherein the storage region providing program comprises instructions for causing the information processing device to realize:

a writing request acceptance unit configured to accept a writing request including data and partial logical region specification information for specifying a partial logical region that is part of the logical region;

an allocation determination unit configured to determine whether part of the physical region is already allocated to the partial logical region specified by the partial logical region specification information included in the accepted writing request;

an initial allocation unit configured to, in a case that part of the physical region is not yet allocated to the partial logical region specified by the partial logical region specification information included in the accepted writing request, allocate at least part of an initial allocation region of the physical region to the partial logical region;

a data writing unit configured to store the data included in the accepted writing request into a partial physical region that is part of the physical region and is allocated to the partial logical region specified by the partial logical region specification information included in the writing request; and a reallocation unit configured to move data stored in the partial physical region included in the initial allocation region to a movement destination region that is at least part of a reallocation region that is other than the initial allocation region of the physical region, and reallocate the movement destination region to the partial logical region with the partial physical region allocated.

(Supplementary Note 12)

The recording medium according to supplementary note 11, wherein:

the storage region providing program comprises instructions for further causing the information processing device to realize a retrieval request acceptance unit configured to accept a retrieval request including partial logical region specification information for specifying a partial logical region that is part of the logical region and is a continuous region in the logical region; and the reallocation unit is configured to, in a case that a partial physical region, which is part of the physical region and allocated to the partial logical region specified by the partial logical region specification information included in the accepted retrieval request, is included in the initial allocation region, acquire a size of the partial logical region and determine the movement destination region so that the movement destination region is continuous over the acquired size.

(Supplementary Note 13)

The recording medium according to supplementary note 11 or 12, wherein:

the physical region is composed of a plurality of physical allocation units;

the logical region is composed of a plurality of logical allocation units;

the storage region providing program comprises instructions for causing the information processing device to allocate part of the physical region to part of the logical region by allocating the physical allocation unit to the logical allocation unit; and a size of the physical allocation unit composing the initial allocation region is equal to or less than a size of the physical allocation unit composing the reallocation region.

(Supplementary Note 14)

A storage region providing device configured to provide a physical region that is a physical storage region of a storage device as a logical region that is a virtual storage region, the storage region providing device comprising:

a writing request acceptance means configured to accept a writing request including data and partial logical region specification information for specifying a partial logical region that is part of the logical region;

an allocation determination means configured to determine whether part of the physical region is already allocated to the partial logical region specified by the partial logical region specification information included in the accepted writing request;

an initial allocation means configured to, in a case that part of the physical region is not yet allocated to the partial logical region specified by the partial logical region specification information included in the accepted writing request, allocate at least part of an initial allocation region of the physical region to the partial logical region;

a data writing means configured to store the data included in the accepted writing request into a partial physical region that is part of the physical region and is allocated to the partial logical region specified by the partial logical region specification information included in the writing request; and a reallocation means configured to move data stored in the partial physical region included in the initial allocation region to a movement destination region that is at least part of a reallocation region that is other than the initial allocation region of the physical region, and reallocate the movement destination region to the partial logical region with the partial physical region allocated.

INDUSTRIAL APPLICABILITY

The present invention is applicable to, for example, a disk array device that provides a physical region that is a physical storage region of a storage device as a logical region that is a virtual storage region.

What is claimed is:

1. A storage region providing device configured to provide a physical region that is a physical storage region of a storage device as a logical region that is a virtual storage region, the storage region providing device comprising:

hardware, including a processor and a computer-readable medium storing a computer program;

a writing request acceptance unit configured to accept a writing request including data and partial logical region specification information for specifying a partial logical region that is part of the logical region;

an allocation determination unit configured to determine whether part of the physical region is already allocated to the partial logical region specified by the partial logical region specification information included in the accepted writing request;

an initial allocation unit configured to, in a case that part of the physical region is not yet allocated to the partial logical region specified by the partial logical region specification information included in the accepted writing request, allocate at least part of an initial allocation region of the physical region to the partial logical region;

a data writing unit configured to store the data included in the accepted writing request into a partial physical region that is part of the physical region and is allocated to the partial logical region specified by the partial logical region specification information included in the writing request;

a reallocation unit configured to move data stored in the partial physical region included in the initial allocation region to a movement destination region that is at least part of a reallocation region that is other than the initial allocation region of the physical region, and reallocate the movement destination region to the partial logical region with the partial physical region allocated; and a retrieval request acceptance unit configured to accept a retrieval request including partial logical region specification information for specifying a partial logical region that is part of the logical region and is a continuous region in the logical region, wherein the reallocation unit is configured to, in a case that a partial physical region, which is part of the physical region and allocated to the partial logical region specified by the partial logical region specification information included in the accepted retrieval request, is included in the initial allocation region, acquire a size of the partial logical region and determine the movement destination region so that the movement destination region is continuous over the acquired size, wherein functionality of each unit is realized by execution of the computer program by the processor.

2. The storage region providing device according to claim 1, wherein:

the physical region is composed of a plurality of physical allocation units;

the logical region is composed of a plurality of logical allocation units;

the storage region providing device is configured to allocate part of the physical region to part of the logical region by allocating the physical allocation unit to the logical allocation unit; and a size of the physical allocation unit composing the initial allocation region is equal to or less than a size of the physical allocation unit composing the reallocation region.

3. The storage region providing device according to claim 2, wherein:

the reallocation region includes a plurality of reallocation partial regions each composed of the physical allocation unit, and a size of the physical allocation unit is different depending on the reallocation partial regions; and the reallocation unit is configured to, in a case that the partial physical region allocated to the partial logical region specified by the partial logical region specification information included in the accepted retrieval request is included in the initial allocation region, select one of the plurality of reallocation partial regions based on a size of the partial logical region, and reallocate at least part of the selected reallocation partial region to the partial logical region.

4. The storage region providing device according to claim 2, comprising an allocation information storage unit configured to store logical allocation unit identification information for identifying the logical allocation unit and physical allocation unit identification information for identifying the physical allocation unit allocated to the logical allocation unit so as to be related to each other, wherein the allocation determination unit is configured to, in a case that the physical allocation unit identification information is stored so as to be related to the logical allocation unit identification information for identifying the logical allocation unit composing the partial logical region, determine that part of the physical region is already allocated to the partial logical region.

5. The storage region providing device according to claim 2, comprising an initial allocation information storage unit configured to store logical allocation unit identification information for identifying the logical allocation unit and initial allocation information representing whether the physical allocation unit allocated to the logical allocation unit is included in the initial allocation region so as to be related to each other, wherein the reallocation unit is configured to, in a case that the initial allocation information representing that the physical allocation unit allocated to the logical allocation unit is included in the initial allocation region is stored in the initial allocation information storage unit so as to be related to the logical allocation unit identification information for identifying the logical allocation unit composing the partial logical region, determine that the partial physical region allocated to the partial logical region is included in the initial allocation region.

6. The storage region providing device according to claim 1, wherein:

the physical region is configured by storage regions of a plurality of storage devices each having a different random retrieval speed depending on the storage devices, the random retrieval speed being a speed of retrieval of data from a plurality of partial regions located at random, and the initial allocation region is configured by a storage region of the storage device having the highest random retrieval speed among the plurality of storage devices.

7. A storage region providing method for providing a physical region that is a physical storage region of a storage device as a logical region that is a virtual storage region, the storage region providing method comprising:

accepting a writing request including data and partial logical region specification information for specifying a partial logical region that is part of the logical region;

determining whether part of the physical region is already allocated to the partial logical region specified by the partial logical region specification information included in the accepted writing request;

in a case that part of the physical region is not yet allocated to the partial logical region specified by the partial logical region specification information included in the accepted writing request, allocating at least part of an initial allocation region of the physical region to the partial logical region;

storing the data included in the accepted writing request into a partial physical region that is part of the physical region and is allocated to the partial logical region specified by the partial logical region specification information included in the writing request;

moving data stored in the partial physical region included in the initial allocation region to a movement destination region that is at least part of a reallocation region that is other than the initial allocation region of the physical region, and reallocating the movement destination region to the partial logical region with the partial physical region allocated;

accepting a retrieval request including partial logical region specification information for specifying a partial logical region that is part of the logical region and is a continuous region in the logical region; and in a case that a partial physical region, which is part of the physical region and allocated to the partial logical region specified by the partial logical region specification information included in the accepted retrieval request, is included in the initial allocation region, acquiring a size of the partial logical region and determining the movement destination region so that the movement destination region is continuous over the acquired size.

8. The storage region providing method according to claim 7, wherein:

the physical region is composed of a plurality of physical allocation units;

the logical region is composed of a plurality of logical allocation units;

the storage region providing method comprises allocating part of the physical region to part of the logical region by allocating the physical allocation unit to the logical allocation unit; and a size of the physical allocation unit composing the initial allocation region is equal to or less than a size of the physical allocation unit composing the reallocation region.

9. A non-transitory computer-readable recording medium that records a storage region providing program comprising instructions for causing an information processing device to provide a physical region that is a physical storage region of a storage device as a logical region that is a virtual storage region, wherein the storage region providing program comprises instructions for causing the information processing device to realize:

a writing request acceptance unit configured to accept a writing request including data and partial logical region specification information for specifying a partial logical region that is part of the logical region;

an allocation determination unit configured to determine whether part of the physical region is already allocated to the partial logical region specified by the partial logical region specification information included in the accepted writing request;

an initial allocation unit configured to, in a case that part of the physical region is not yet allocated to the partial logical region specified by the partial logical region specification information included in the accepted writing request, allocate at least part of an initial allocation region of the physical region to the partial logical region;

a data writing unit configured to store the data included in the accepted writing request into a partial physical region that is part of the physical region and is allocated to the partial logical region specified by the partial logical region specification information included in the writing request;

a reallocation unit configured to move data stored in the partial physical region included in the initial allocation region to a movement destination region that is at least part of a reallocation region that is other than the initial allocation region of the physical region, and reallocate the movement destination region to the partial logical region with the partial physical region allocated; and a retrieval request acceptance unit configured to accept a retrieval request including partial logical region specification information for specifying a partial logical region that is part of the logical region and is a continuous region in the logical region, wherein the reallocation unit is configured to, in a case that a partial physical region, which is part of the physical region and allocated to the partial logical region specified by the partial logical region specification information included in the accepted retrieval request, is included in the initial allocation region, acquire a size of the partial logical region and determine the movement destination region so that the movement destination region is continuous over the acquired size, wherein functionality of each unit is realized by execution of the storage region providing program by a processor of the information processing device.

10. The non-transitory recording medium according to claim 9, wherein:

the physical region is composed of a plurality of physical allocation units;

the logical region is composed of a plurality of logical allocation units;

the storage region providing program comprises instructions for causing the information processing device to allocate part of the physical region to part of the logical region by allocating the physical allocation unit to the logical allocation unit; and a size of the physical allocation unit composing the initial allocation region is equal to or less than a size of the physical allocation unit composing the reallocation region.

* * * * *